:::
United States Patent
Hori et al.

(12)
(10) Patent No.: US 6,246,531 B1
(45) Date of Patent: Jun. 12, 2001

(54) OPTICAL PICKUP FOR ENABLING ACCURATE MEASUREMENT OF VARIOUS CHARACTERISTICS THEREOF WITHOUT INCREASING THE NUMBER OR PARTS

(75) Inventors: Ken'Ichi Hori, Kawasaki; Kazuya Okano, Yokohama, both of (JP)

(73) Assignees: Mitsumi Electric Co., Ltd.; FCI Japan K.K., both of Tokyo (JP)

( * ) Notice: Subject to any disclaimer, the term of this patent is extended or adjusted under 35 U.S.C. 154(b) by 0 days.

(21) Appl. No.: 09/632,224

(22) Filed: Aug. 4, 2000

(30) Foreign Application Priority Data

Aug. 5, 1999 (JP) .................................................. 11-222340

(51) Int. Cl.[7] .................................. G02B 7/02; G11B 7/00
(52) U.S. Cl. .......................................... 359/811; 369/44.14
(58) Field of Search ...................................... 359/811, 813, 359/814, 823, 824; 369/44.14, 44.15

(56) References Cited

U.S. PATENT DOCUMENTS 5,541,899 * 7/1996 Kume et al. ....................... 369/44.14
5,666,235 * 9/1997 Izuka ..................................... 359/814

FOREIGN PATENT DOCUMENTS

10312558 * 11/1998 (JP) .

* cited by examiner

Primary Examiner—Ricky Mack
(74) Attorney, Agent, or Firm—Frishauf, Holtz, Goodman, Langer & Chick, P.C.

(57) ABSTRACT

In an optical pickup (1) in which an objective lens (22) is held by a lens holder (21) elastically suspended by a damper base (23) through a conductive wire (24), the damper base has a base body (41) and is provided with a first and a second conductive land (42,43) attached directly to a principal insulation surface of the base body. The first conductive land is electrically connected to the conductive wire. The second conductive land is electrically connected to the first conductive land and is for being electrically connected with a flexible circuit member such as an FPC (16).

9 Claims, 5 Drawing Sheets

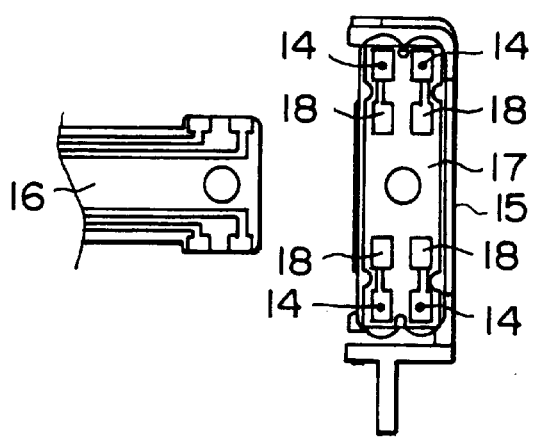
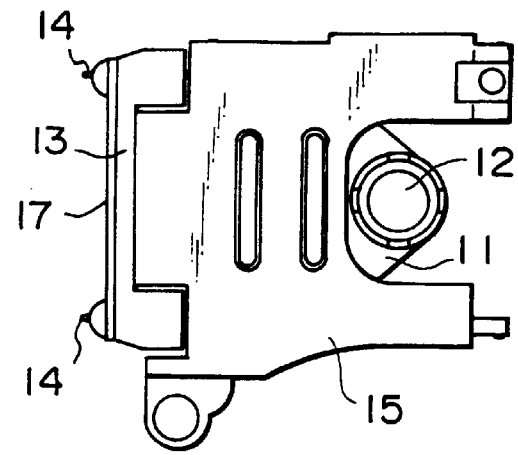
FIG. 2A PRIOR ART
FIG. 2B PRIOR ART
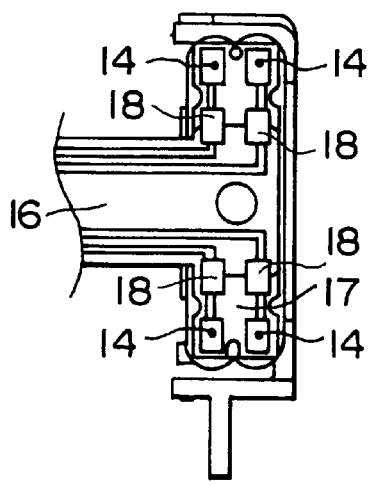
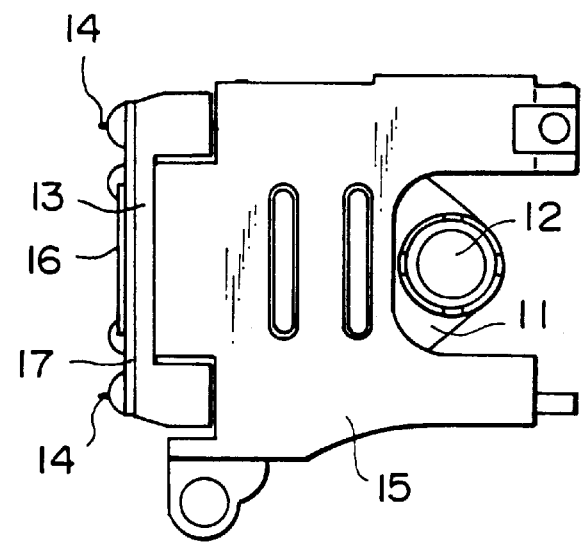
FIG. 2C PRIOR ART
FIG. 2D PRIOR ART

OPTICAL PICKUP FOR ENABLING ACCURATE MEASUREMENT OF VARIOUS CHARACTERISTICS THEREOF WITHOUT INCREASING THE NUMBER OR PARTS

BACKGROUND OF THE INVENTION

This invention relates to an optical pickup suitable for use in an optical disk drive and, in particular, to an optical pickup in which an objective lens is elastically supported by a suspension member.

With reference to FIGS. 1A–1D, a first one of conventional optical pickups of the type will be described. The first conventional optical pickup comprises a lens holder 11, an objective lens 12 held by the lens holder 11, a damper base 13, and four conductive wires 14 as a suspension member for elastically suspending the lens holder 11 to the damper base 13. A cover 15 is connected to the damper base 13 and extends to cover the lens holder 11. The lens holder 11 is provided with a coil unit (not shown) electrically connected to the conductive wires 14. The cover 15 is provided with a magnet (not shown) placed adjacent to the coil unit. The cover 15 is held by a frame of a optical disk drive.

Each of the conductive wires 14 penetrates the damper base 13 to have an end portion 14a exposed from the damper base 13. A flexible printed circuit (FPC) 16 is attached to the damper base 13. The FPC 16 has a plurality of electric circuits connected to the conductive wires 14 in the manner which will later be described. The coil unit is supplied with an electric signal from a control part of the optical disk drive through the FPC 16 and the conductive wires 14.

For connection of the suspension wires 14 to the FPC 16, the end portion 14a of each of the conductive wires 14 are provisionally fixed to the damper base 13 by the use of an adhesive as illustrated in FIGS. 1A and 1B. When the first conventional optical pickup is thereafter assembled into a housing of the optical disk drive, the end portion 14a is soldered to the FPC 16 as illustrated in FIGS. 1C and 1D.

The first conventional optical pickup is disadvantageous in the following respects. In a production process, energizing is carried out to measure various characteristics by the use of a measuring instrument before the first conventional optical pickup is assembled into the housing. At this time, a probe of the measuring instrument is brought into direct contact with the end portion 14a of each of the conductive wires 14, i.e., the terminals, which are only provisionally fixed by the adhesive. Therefore, the conductive wires 14 are inevitably applied with additional force exerted by the probe. This makes it difficult to accurately measure kinetic characteristics. Furthermore, since the conductive wires 14 are thereafter fixed to the FPC 16 by soldering, the adhesive may be melted by heat. In this event, the objective lens 12 is moved out of position.

With reference to FIGS. 2A–2D, a second one of the conventional optical pickups will be described. Similar parts are designated by like reference numerals.

In the second conventional optical pickup, an intermediate substrate 17 is attached to the damper base 13. The end portion 14a of each of the conductive wires 14 are soldered to the intermediate substrate 17, as illustrated in FIGS. 2A and 2B. In this state, various characteristics are measured by the use of the measuring instrument. When the second conventional optical pickup is thereafter assembled into the housing, the FPC 16 is soldered to a plurality of connection lands 18 formed on the intermediate substrate 17, as illustrated in FIGS. 2C and 2D.

In order to measure various characteristics before assembling, the intermediate substrate 17 is provided with test pins (not shown) which are brought into contact with the probe. With the second conventional optical pickup, the conductive wires 4 may not directly be contacted by the probe and are therefore prevented from being applied with the additional force described in conjunction with the first conventional optical pickup. However, the number of parts is increased by provision of the intermediate substrate 17. In addition, the manhour required in the production process is also increased.

SUMMARY OF THE INVENTION

It is therefore an object of this invention to provide an optical pickup which enables accurate measurement of various characteristics of thereof without increasing the number or parts.

It is another object of this invention to provide an optical pickup of the type described, which enables easy connection of an FPC without causing an objective lens to be moved out of position.

Other objects of this invention will become clear as the description proceeds.

According to this invention, there is provided an optical pickup including a lens holder, an objective lens held by the lens holder, a damper base, and a suspension member for elastically suspending the lens holder to the damper base. The damper base comprises a base body having a principal insulation surface, a first conductive land attached directly to the principal insulation surface and electrically connected to the suspension member, and a second conductive land attached directly to the principal insulation surface and electrically connected to the first conductive land for being electrically connected with a flexible circuit member.

BRIEF DESCRIPTION OF THE DRAWING

FIGS. 2A and 2B are a rear view and a plan view of a second conventional optical pickup before connection of an FPC, respectively;

FIGS. 2C and 2D are a rear view and a plan view of the second conventional optical pickup after connection of the FPC, respectively;

DESCRIPTION OF THE PREFERRED EMBODIMENT

Figure 1A:
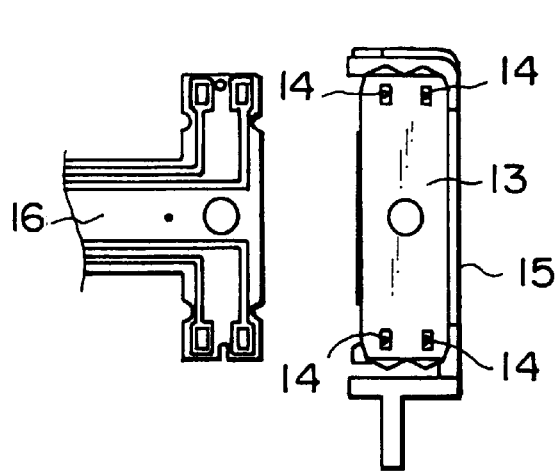
FIGS. 1A and 1B are a rear view and a plan view of a first conventional optical pickup before connection of an FPC, respectively.
Figure 1B:
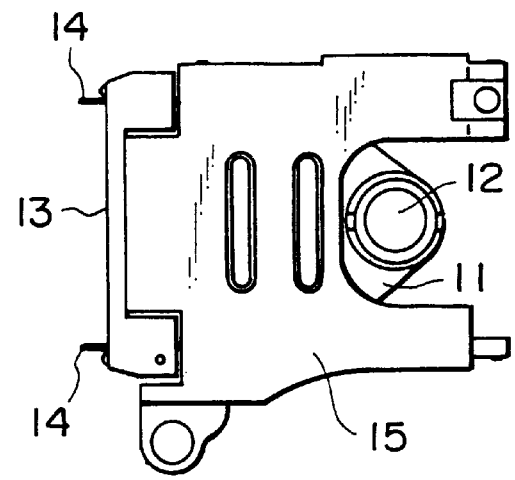
Figure 1C:
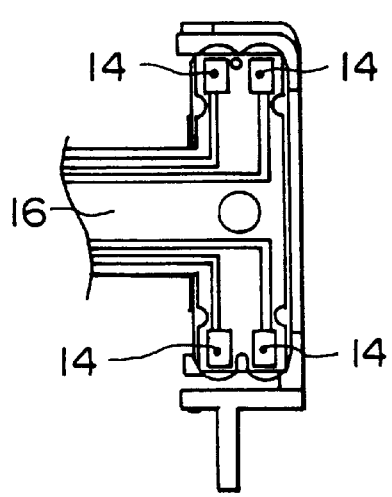
FIGS. 1C and 1D are a rear view and a plan view of the first conventional optical pickup after connection of the FPC, respectively.
Figure 1D:
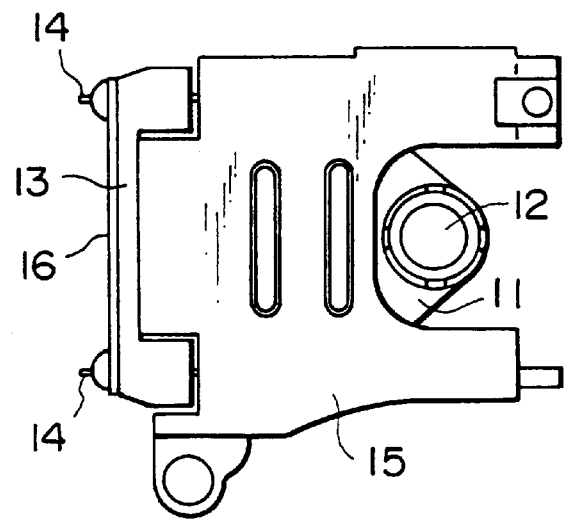

Now, description will be made of this invention with reference to the drawing.

Referring to FIGS. 3A through 3E, an optical pickup 1 according to an embodiment of this invention is for use in an optical disk drive such as a CD-R (Compact Disk-Recordable) known in the art.

The optical pickup 1 comprises a lens holder 21, an objective lens 22 held at an end of the lens holder 21, a damper base 23, and four suspension wires or conductive wires 24 as a suspension member for elastically suspending the lens holder 21 to the damper base 23. Each of the conductive wires 24 is made of elastic wire member. A cover 25 is connected to the damper base 23 and extends to cover a part of the lens holder 21. A frame of the optical disk drive holds the cover 25.

The lens holder 21 is provided with a coil unit 31 which will later be described. The cover 25 is provided with a magnet assembly 32 which is placed adjacent to the coil unit 31. The magnet assembly 32 comprises a yoke 33 supported by the cover 25 and first and second permanent magnets 34a and 34b coupled to first and second portions 33a and 33b of the yoke 33, respectively. The first and the second portions 33a and 33b of the yoke 33 are opposite to each other. The first and the second permanent magnets 34a and 34b are placed between the first and the second portions 33a and 33b to have a space therebetween and are fixedly attached to the first and the second portions 33a and 33b, respectively.

The coil unit 31 comprises a focusing coil 31a and a tracking coil 31b electrically connected to the conductive wires 24 in the manner known in the art. The focusing coil 31a is adapted to receive, in its center portion, the first yoke 33a and the first permanent magnet 34a. The tracking coil 31b is placed in the space between the first and the second permanent magnet 34a and 34b to face the second permanent magnet 34b. It is to be noted that a gap is left between the magnet assembly 32 and each of the focusing and the tracking coils 31a and 31b.

Figure 4C:
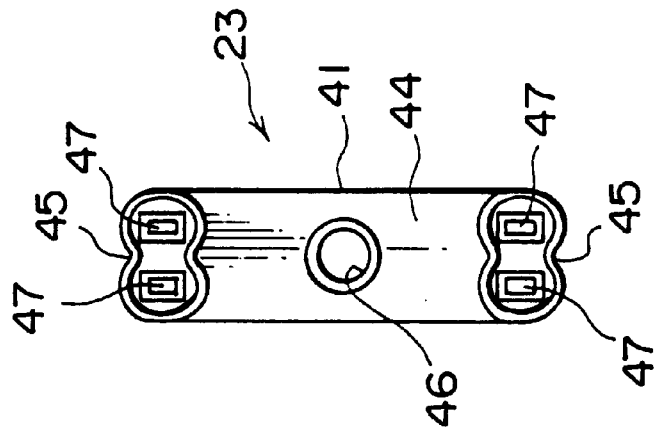
FIGS. 4A, 4B, and 4C are a rear view, a plan view, and a front view of a damper base of the optical pickup illustrated in FIGS. 3A and 3B, respectively.
Figure 4B:
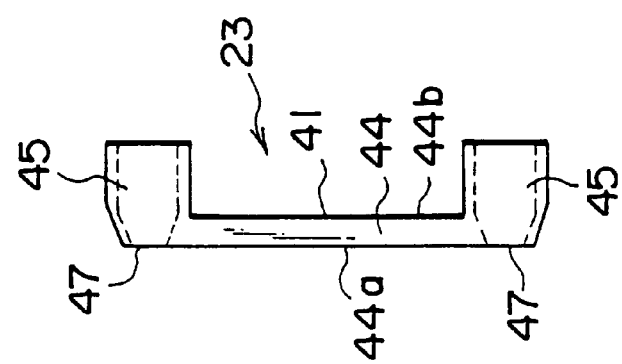
Figure 4A:
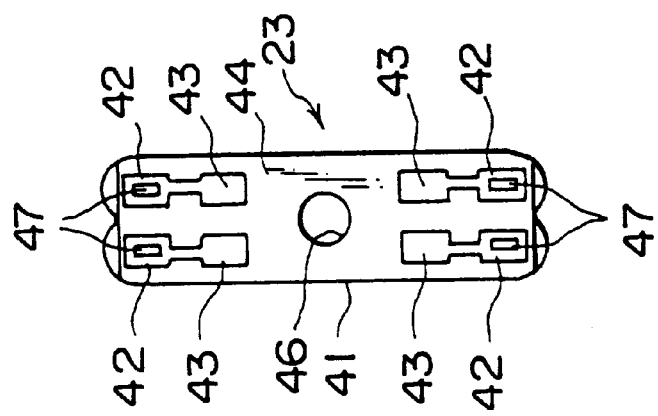

With reference to FIGS. 4A through 4C in addition, the description will be directed to the damper base 23.

The damper base 23 comprises a base body 41 made of transparent synthetic resin, four wire-fixing lands 42 as a first conductive land, and four FPC-connecting lands 43 as a second conductive land. The base body 41 comprises a fixed portion 44 and a pair of wire insertion portions 45 at opposite ends of the fixed portion 44. The fixed portion 44 is of a generally plate-like shape and has first and second surfaces 44a and 44b opposed to each other. The wire insertion portions 45 protrude from the second surface 44b of the fixed portion 44. The first surface 44a is referred to as a principal insulation surface.

Figure 3A:
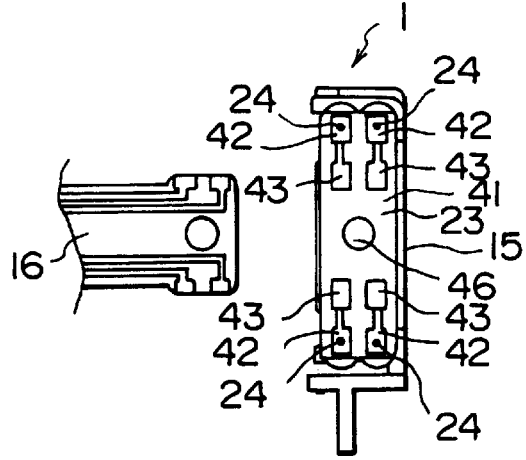
FIGS. 3A and 3B are a rear view and a plan view of an optical pickup according to one embodiment of this invention before connection of an FPC, respectively.
Figure 3B:
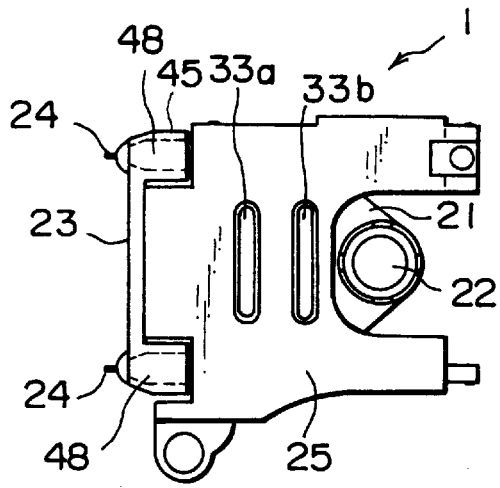
Figure 3C:
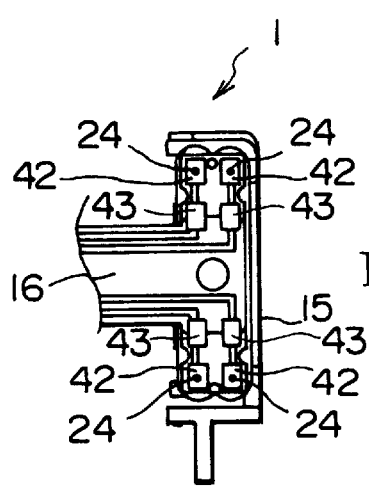
FIGS. 3C and 3D are a rear view and a plan view of the optical pickup in FIGS. 3A and 3B after connection of the FPC, respectively.
Figure 3D:
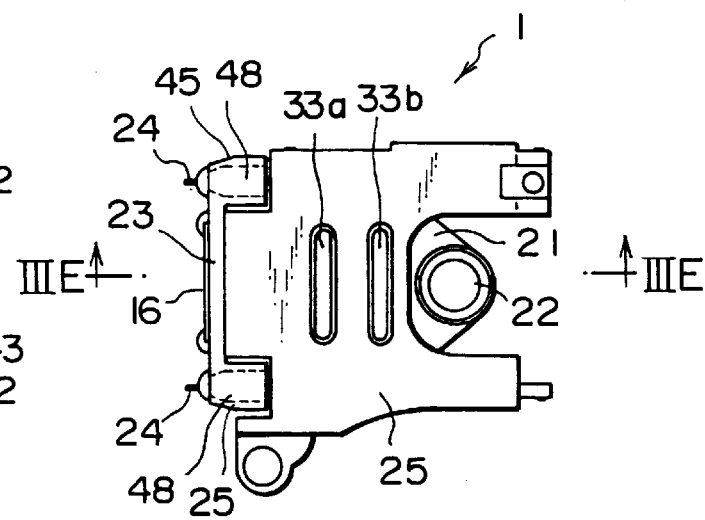
Figure 3E:
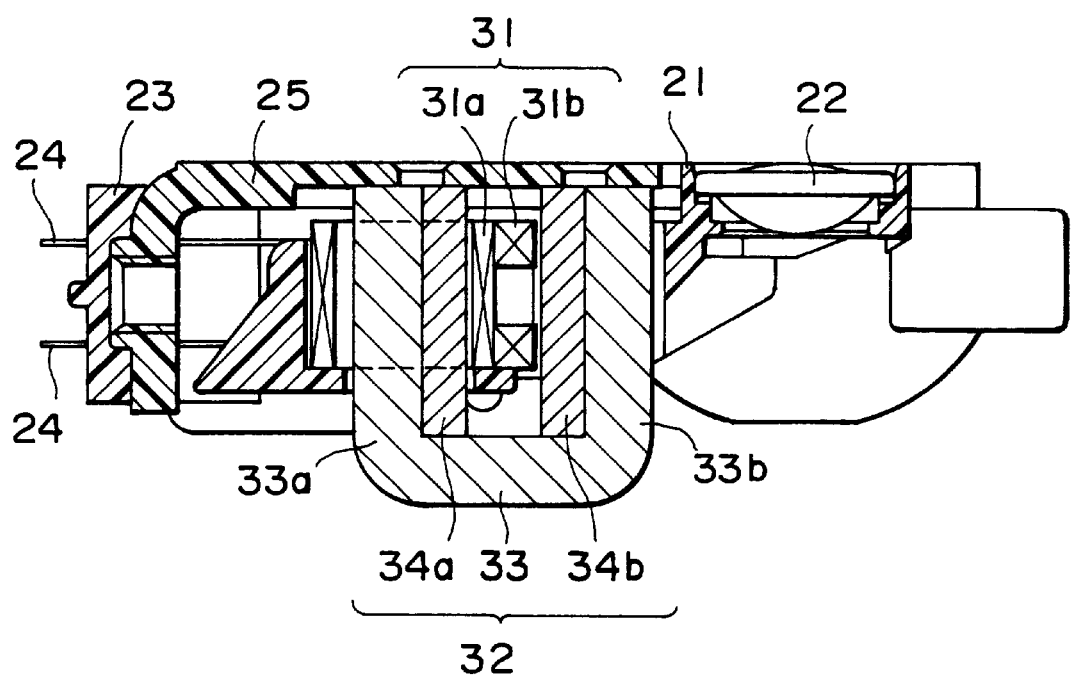
FIG. 3E is a sectional view taken along a line IIIE—IIIE in FIG. 3D.

The fixed portion 44 is provided with a through hole 46 at its center and fixed to the cover 25 by screws (not shown) inserted into the through hole 46. In addition, the fixed portion 44 is provided with four through holes 47, two of which being at an end portion thereof and other two of which being at another end portion thereof. Each of the wire insertion portions 45 has a cylindrical shape with a gourd-like section. At each of end portions of the fixed portion 44, two of the through holes 47 are communicated with each of the wire insertion portions 45. It is to be noted that, as shown in FIGS. 3B and 3D, the wire insertion portions 45 are filled with damping members or materials 48 to attenuate vibration of the conductive wires 24 passing through the wire insertion portions 45, respectively. Each of the damping members is made of gel material known in the art.

Each of the wire-fixing lands 42 is formed directly on or attached directly to the first surface 44a of the fixed portion 44 to surround each corresponding through hole 46. The end portions of the conductive wires 24 protrude from the first surface 44a of the fixed portion 44 through the wire insertion portions 45 and the through holes 47 and soldered to the wire-fixing lands 42, respectively. Thus, the end portions of the conductive wires 24 are mechanically fixed to the damper base 23 and electrically connected to the wire-fixing lands 42. It is to be noted that the other end portions of the conductive wires 24 are fixed to the lens holder 21. Thus, the damper base 23 elastically and swingably supports the lens holder 21 through the conductive wires 24.

The FPC-connecting lands 43 are formed directly on or attached directly to the first surface 44a of the fixed portion 44 to be positioned inside the wire-fixing lands 42, respectively. A part of each FPC-connecting land 43 extends to reach the wire-fixing land 42 and is electrically connected thereto. The FPC 16 is attached to the first surface 44a of the fixed portion 44 and is connected to the FPC-connecting lands 43. Thus, the FPC 16 is electrically connected to the conductive wires 4 through the FPC-connecting lands 43 and the wire-fixing lands 42.

A combination of the damper base 23, the wire-fixing lands 32, and the FPC-connecting lands 33 is produced by the use of a molded interconnect device (MID) production technique known in the art.

It is noted here that a molded interconnect device produced by the MID production technique is a three-dimensional circuit component comprising a plastic molded product and a conductive circuit formed thereon as a plating film. By utilizing the freedom of the three-dimensional configuration, it is possible to provide a mechanical function and an electrical function as desired. In addition, an optical function may be provided by the use of light reflectance of the plating film. As the MID production technique, various methods are available. In order to form the circuit on the plastic molded product by plating, use may be made of a photo-imaging method or a direct exposure method in dependence upon the configuration of the molded product or a circuit pattern of the circuit. In the photo-imaging method, the molded product is coated with a photomask and then subjected to ultraviolet exposure. In the direct exposure method, a laser beam is used. Each of these methods is basically similar to a method of producing a printed circuit board, which utilizes a semi-additive technique or a subtractive technique and which is presently carried out for a glass epoxy substrate, but is characterized in that the circuit is formed on a three-dimensional injection molded product. These methods are called "one-shot methods". Use may be made of other methods, such as a film transfer method and a two-shot method. In the film transfer method, the circuit is formed on a film and transferred to the molded product. In the two-shot method, a circuit portion and a non-circuit portion are molded in two-color molding and the circuit is formed by plating.

Returning to FIGS. 3A–3E, the description will be made about a production process of the optical pickup 1.

At first, the end portions of the conductive wires 24 are inserted through the wire insertion portions 45 and the through holes 47. The end portions are soldered to the wire-fixing lands 42. Similarly, the other ends of the conductive wires 24 are soldered to the lens holder 21 provided with the objective lens 22, the focusing coil 31a, and the tracking coil 31b. In the above-mentioned manner, an assembly including the damper base 23 and the lens holder 21 is formed.

Next, the first yoke 33a and the first permanent magnet 34a attached thereto are placed within the center portion of the focusing coil 31a and the second permanent magnet 34b attached to the second yoke 33b is faced to the tracking coil 31b.

Then, through the through hole 46 of the damper base 23, the screw is engaged with the cover 25 but stopped slightly before it is completely tightened. In this state, skew adjustment is carried out to place the objective lens 22 in a horizontal position. After completion of the skew adjustment, the screw is completely tightened to fix the damper base 23 to the cover 25. Thus, the optical pickup 1 is completed.

When the optical pickup 1 is completed, various characteristics of the optical pickup 1 are measured before the FPC 16 is connected thereto. The measurement of the various characteristics is carried out by bringing a probe of a measuring instrument (not shown) into press contact with the FPC-connecting lands 43. Thus, the probe of the measuring instrument is electrically conducted to each of the conductive wires 24 through each of the FPC-connecting lands 43, but is not directly contacted with the conductive wires 24 provisionally fixed by the adhesive. Therefore, the conductive wires 24 are prevented from movement so that the various characteristics of the optical pickup 1 for an optical disk can be accurately measured. As is obvious from the above, the FPC-connecting lands 43 serve as test pins.

As will be understood from the foregoing description, the conductive wires 24 are soldered to the wire-fixing lands 42 at a first stage without provisionally fixing the conductive wires 24 by the adhesive. Therefore, the suspension wires 24 are prevented from movement thereof. This makes it possible to prevent the objective lens 22 from being moved out of position.

After the measurement of various characteristics of the optical pickup 1 is finished, the FPC 16 is soldered to the FPC-connecting lands 43. Since it is unnecessary to use the above-mentioned intermediate substrate, the FPC 16 can be simply connected to the conductive wires 24 through the FPC-connecting lands 43 without increasing the number of components.

While the present invention has thus far been described in connection with a single embodiment thereof, it will readily be possible for those skilled in the art to put this invention into practice in various other manners. For example, the damper base may be produced in various other manners, for example, by typical injection molding. In this case, the wire-fixing lands and the FPC-connecting lands obtained by punching a metal thin plate are adhered to the damper base body.

What is claimed is:

1. An optical pickup including a lens holder, an objective lens held by said lens holder, a damper base, and a suspension member for elastically suspending said lens holder to said damper base, said damper base comprising:

a base body having a principal insulation surface;

a first conductive land attached directly to said principal insulation surface and electrically connected to said suspension member; and a second conductive land attached directly to said principal insulation surface and electrically connected to said first conductive land for being electrically connected with a flexible circuit member.

2. An optical pickup as claimed in claim 1, further comprising:

a coil unit held by said lens holder and electrically connected to said first conductive land through said suspension member; and a magnet assembly connected relative to said damper base and placed adjacent to said coil unit.

3. An optical pickup as claimed in claim 2, further comprising a cover connected to said base body and extending to cover a part of said lens holder, said magnet assembly being supported by said cover.

4. An optical pickup as claimed in claim 3, wherein said magnet assembly comprises:

a yoke supported by said cover; and a permanent magnet coupled to said yoke.

5. An optical pickup as claimed in claim 1, wherein said suspension member comprises a plurality of conductive elastic wires each of which elastically suspends said lens holder to said damper base.

6. An optical pickup as claimed in claim 5, wherein said base body has a plurality of through holes each extending from said principal insulation surface, said conductive elastic wires extending through said through holes, respectively, said damper base further comprising a plurality of damping members placed in said through holes to attenuate vibration of said conductive elastic wires, respectively.

7. An optical pickup as claimed in claim 6, wherein said first conductive land has a plurality of land portions, each of said conductive elastic wires has an end portion which protrudes from said principal insulation surface and connected to each of said land portions of the first conductive land.

8. An optical pickup as claimed in claim 7, wherein said second conductive land has a plurality of land portions electrically connected to said land portions of first conductive land, respectively.

9. An optical pickup as claimed in claim 1, wherein said base body is made of made of synthetic resin, a combination of said base body and said first and said second conductive lands being produced by an MID production technique.

* * * * *